`US006993471B1`

United States Patent
Flanagan et al.

(10) Patent No.: US 6,993,471 B1
(45) Date of Patent: *Jan. 31, 2006

(54) INTEGRATED MULTILINGUAL BROWSER

(75) Inventors: Mary A. Flanagan, Framingham, MA (US); John A. Lammers, Acton, MA (US)

(73) Assignee: America Online, Inc., Dulles, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/555,916

(22) Filed: Nov. 13, 1995

(51) Int. Cl.
G06F 15/46 (2006.01)

(52) U.S. Cl. ....................................................... 704/2
(58) Field of Classification Search ................. 395/751, 395/752, 755, 756, 758; 704/1, 2, 5, 6, 9
See application file for complete search history.

(56) References Cited

U.S. PATENT DOCUMENTS

| | | | |
|---|---|---|---|
| 4,962,452 A | * 10/1990 | Nogami et al. | |
| 4,964,030 A | * 10/1990 | Suzuki et al. | |
| 5,005,127 A | * 4/1991 | Kugimiya et al. | ............. 704/5 |
| 5,243,519 A | 9/1993 | Andrews et al. | ....... 364/419.05 |
| 5,295,068 A | * 3/1994 | Nishino et al. | |
| 5,361,205 A | 11/1994 | Nishino et al. | ........ 364/419.02 |
| 5,373,442 A | 12/1994 | Kutsumi et al. | ....... 364/419.04 |
| 5,548,508 A | 8/1996 | Nagami | ................. 364/419.02 |
| 5,587,902 A | 12/1996 | Kugimiya | ................... 395/752 |
| 5,608,622 A | * 3/1997 | Church | |
| 5,675,817 A | * 10/1997 | Moughanni et al. | |
| 5,740,231 A | 4/1998 | Cohn et al. | .................... 379/89 |
| 5,752,246 A | * 5/1998 | Rogers et al. | |
| 5,822,720 A | * 10/1998 | Bookman et al. | ............... 705/3 |
| 5,855,015 A | * 12/1998 | Shoham | ......................... 707/5 |
| 6,493,735 B1 | * 12/2002 | Kumhyr | ..................... 715/536 |

OTHER PUBLICATIONS

"Web Agent related research at the Center for Machine Translation", Michael L. maudlin and John R.R. Leavitt, Aug. 4, 199 5 pages, http://www.fuzine.com/lti/pub/sing-nidr94.*

Michael L. Mauldin and John R. R. Leavitt, "Web Agent related Research at the Center for Machine Translation", Aug. 4, 1994, 5 pages, <http://www.fuzine.com/lti/pub/sing-nidr94>.*

"Globalink to provide Netscape clients with on–line language translation . . . ", Business Wire, Sep. 18, 1995.*

"Computer Translation Service Debuts in Spain Jan. 26, 1994", Newsbytes News Network, Jan. 26, 1994.*

"Internet to get free translation software . . . ", CommunicationsWeek International, pp. 6, Nov. 6, 1995.*

* cited by examiner

Primary Examiner—James P. Trammell
Assistant Examiner—Cristina Sherr
(74) Attorney, Agent, or Firm—Standley Law Group LLP

(57) ABSTRACT

The disclosed system translates into different languages HTML documents available through the World Wide Web. HTML documents are translated by machine translation software bundled in a browser. Alternatively, documents are retrieved as needed, translated, and stored on a Web server so user requests are serviced with a document that has been translated from a different language. The disclosed invention expands usage of the Internet for non-English speakers.

83 Claims, 19 Drawing Sheets

```
<html>
<head><title>NLT Home</title></head>
<br><center><img src="file:///n|/iowebsrv/server/8100~1.1/server~1/image/nlt.jpg"
height=60 width=640></center>
<hr>
<center><h1></h1></center>
<br><img src="file:///n|/iowebsrv/server/8100~1.1/server~1/image/nltprod.jpg" height=60 width=96>
<h1>NLT Products</h1>
<br><UL><LI><a href="http://www.compuserve.com/cgi-bin/gocserve?CIS:EWCFORUM">World Community Forum</a></UL>
<br><UL><LI><a href="http://www.compuserve.com/cgi-bin/gocserve?CIS:TRANSLATE">CompuServe Document Translation Service (CDTS)</a></UL>
<center><h1></h1></center>
<br><img src="file:///n|/iowebsrv/server/8100~1.1/server~1/image/wip.jpg" height=60 width=96>
<h1>Works-In-Progress</h1>
<br><UL><LI><a href="nlttest.htm">Experimental Area (Enter at your own risk....)</a></UL>
<br><UL><LI><a href="llab.htm">Language Lab</a></UL>
<br><UL><LI><a href="mailtran.htm">E-Mail Translation</a></UL>
<br><UL><LI><a href="webtrans.htm">Web Page Translation</a></UL>
```

FROM FIG-2A

```
<center><h1></h1></center>
<br><img src="file:///n|/iowebsrv/server/8100~1.1/server~1/image/fracmtn.jpg" height=80 width=106>
<h1>Proposals</h1>
<br><UL><LI><a href="http://jlammers/n:\projects\proposal\rose_gl.doc">Rose-Colored Glasses</a></UL>
<center><h1></h1></center>
<br><img src="file:///n|/iowebsrv/server/8100~1.1/server~1/image/isle.jpg" height=80 width=106>
<h1>Points of Interest</h1>
<br><UL><LI><a href="http://www.willamette.edu:80/~tjones/Language-Page.html">The Human Languages Page</a></UL>
<br><UL><LI><a href="http://www.ai.mit.edu">MIT Artificial Intelligence Lab</a></UL>
<center><h1></h1></center>
<br><img src="file:///n|/iowebsrv/server/8100~1.1/server~1/image/mailto.gif" height=20 width=27>
<p>Send comments/questions to: </p>
<br><a href="mailto:jlammers@csi.compuserve.com">NLT Mailbox</a>
</body>
</html>
```

FIG-2B

```
{.<html>.}

{.<head>.} {.<title>.}NLT Home{.</title>.} {.</head>.}

{.<br>.}

{.<center>.} {.<img src="file:///n|/iowebsrv/server/8100~1.1/server~1/image/nlt.jpg"
height=60 width=640>.} {.</center>.}

{.<hr>.}
{.<center>.} {.<h1>.} {.</h1>.} {.</center>.}

{.<br>.}{.<img src="file:///n|/iowebsrv/server/8100~1.1/server~1/image/nltprod.jpg" height=60 width=96>.}

{.<h1>.}NLT Products{.</h1>.}

{.<br>.}{.<UL>.}{.<LI>.}{.<a href="http://www.compuserve.com/cgi-bin/gocserve?CIS:EWCFORUM">.} World
Community Forum{.</a>.} {.</UL>.}

{.<br>.}{.<UL>.}{.<LI>.}{.<a href="http://www.compuserve.com/cgi-bin/gocserve?CIS:TRANSLATE">.}
CompuServe Document Translation Service (CDTS){.</a>.}{.</UL>.}

{.<center>.} {.<h1>.} {.</h1>.} {.</center>.}
```

FROM FIG-3A

{.<br>.} {.<img src="file:///n|/iowebsrv/server/8100~1.1/server~1/image/wip.jpg" height=60 width=96>.}

{.<h1>.} Works-In-Progress {.</h1>.}

{.<br>.} {.<UL>.} {.<LI>.} {.<a href="nlttest.htm">.} Experimental Area (Enter at your own risk...) {.</a>.}{.</UL>.}

{.<br>.} {.<UL>.} {.<LI>.} {.<a href="llab.htm">.}Language Lab{.</a>.} {.</UL>.}

{.<br>.} {.<UL>.} {.<LI>.} {.<a href="mailtran.htm">.} E-Mail Translation{.</a>.} {.</UL>.}

{.<br>.} {.<UL>.} {.<LI>.} {.<a href="webtrans.htm">.} Web Page Translation{.</a>.} {.</UL>.}

{.<center>.} {.<h1>.} {.</h1>.} {.</center>.}

{.<br>.} {.<img src="file:///n|/iowebsrv/server/8100~1.1/server~1/image/fracmtn.jpg" height=80 width=106>.}

{.<h1>.} Proposals {.</h1>.}

{.<br>.} {.<UL>.} {.<LI>.} {.<a href="http://jlammers/n:\projects\proposal\rose_gl.doc">.} Rose-Colored Glasses {.</a>.}{.</UL>.}

FROM FIG-3B

{.<center>.} {.<h1>.} {.</h1>.} {.</center>.}

{.<br>.} {.<img src="file:///n|/iowebsrv/server/8100~1.1/server~1/image/isle.jpg" height=80 width=106>.}

{.<h1>.}Points of Interest {.</h1>.}

{.<br>.} {.<UL>.} {.<LI>.} {.<a href="http://www.willamette.edu:80/~tjones/Language-Page.html">.} The Human Languages Page {.</a>.} {.</UL>.}

{.<br>.} {.<UL>.} {.<LI>.} {.<a href="http://www.ai.mit.edu">.}MIT Artificial Intelligence Lab {.</a>.} {.</UL>.}

{.<center>.} {.<h1>.} {.</h1>.}{.</center>}

{.<br>.} {.<img src="file:///n|/iowebsrv/server/8100~1.1/server~1/image/mailto.gif" height=20 width=27>.}

{.<p>.}Send comments/questions to: {.</p>.}

{.<br>.} {.<a href="mailto:jlammers@csi.compuserve.com">.}NLT Mailbox {.</a>.}

{.</body>.}

{.</html>.}

FIG-3C

```
{.<html>.}
{.<head>.} {.<title>.}NLT Maison{.</title>.} {.</head>.}
{.<br>.}
{.<center>.} {.<img
src="file:///nl/iowebsrv/server/8100~1.1/server~1/image/nlt.jpg" height=60
width=640>.} {.</center>.}
{.<hr>.}
{.<center>.} {.<h1>.} {.</h1>.} {.</center>.}
{.<br>.} {.<img
src="file:///nl/iowebsrv/server/8100~1.1/server~1/image/nltprod.jpg" height=60 width=96>.}
{.<h1>.}NLT Produits{.</h1>.}
{.<br>.} {.<UL>.} {.<LI>.} {.<a
href="http://www.compuserve.com/cgi-bin/gocserve?CIS:EWCFORUM">.}
Forum Communauté globale {.</a>.} {.</UL>.}
```

FROM FIG-5A

{.<br>.} {.<UL>.} {.<LI>.} {.<a href="http://www.compuserve.com/cgi-bin/gocserve?CIS:TRANSLATE">.} Le Service de Traduction de Document de compuServe (CDTS) {.</a>.}{.</UL>.}

{.<center>.} {.<h1>.} {.</h1>}{.</center>.}

{.<br>.} {.<img src="file:///n|/iowebsrv/server/8100~1.1/server~1/image/wip.jpg" height=60 width=96>.}

{.<h1>}Les travaux-dans-le progrès{.</h1>.}

{.<br>.} {.<UL>.} {.<LI>.} {.<a href="nlttest.htm">.}Le Domaine expérimental (Introduit à votre propre risque...){.</a>.}{.<UL>.}

{.<br>.} {.<UL>.} {.<LI>.} {.<a href="llab.htm">.}Laboratoire de langue {.</a>.} {.</UL>.}

{.<br>.} {.<UL>.} {.<LI>.} {.<a href="mailtran.htm">.}Envoyer un message par courrier électronique la Traduction{.</a>.} {.</UL>.}

{.<br>.} {.<UL>.} {.<LI>.} {.<a href="webtrans.htm">.}La Traduction de Page de toile{.</a>.} {.</UL>.}

FIG-5B

```
{.<center>.}{.<h1>.}{.</h1>.}{.</center>.}

{.<br>.} {.<img
.src="file:///n|/iowebsrv/server/8100~1.1/server~1/image/fracmtn.jpg" height=80 width=106>.}

{.<h1>.} Propositions{.</h1>.}

{.<br>.} {.<UL>.} {.<LI>.} {.<a
href="http://jlammers/n:\projects\proposal\rose_gl.doc">.} Verres Elevé-Colorés {.</a>.} {.</UL>.}

{.<center>.} {.<h1>.} {.</h1>.} {.</center>.}

{.<br>.} {.<img
.src="file:///n|/iowebsrv/server/8100~1.1/server~1/image/isle.jpg" height=80 width=106>.}

{.<h1>.}{.Les points d'Intérêt{.</h1>.}

{.<br>.} {.<UL>.} {.<LI>.} {.<a
href="http://www.willamette.edu:80/~tjones/Language-Page.html">.}
La Page de Langues Humaine {.</a>} {.</UL>.}
```

FROM FIG-5C

```
{.<br>.} {.<UL>.} {.<LI>.} {.<a href="http://www.ai.mit.edu">.}MIT le Laboratoire d'Intelligence
Artificiel {.</a>.} {.</UL>.}

(.<center>.) {.<h1>.} {.</h1>.} {.</center>.)

{.<br>.}{.<img
src="file:///n|/iowebsrv/server/8100~1.1/server~1/image/mailto.gif" height=20 width=27>.}

{.<p>.}Les commente/questions d'envoi à: {.</p>.}

{.<br>.} {.<a href="mailto:jlammers@csi.compuserve.com">.}NLT Boîte à lettres {.</a>.}

{.</body>.}

{.</html>.}
```

FIG-5D

```
<html>
<head><title>NLT Maison</title></head>
<br>
<center><img
src="file:///nl/iowebsrv/server/8100~1.1/server~1/image/nlt.jpg"
height=60 width=640></center>
<hr>
<center><h1></h1></center>
<br><img
src="file:///nl/iowebsrv/server/8100~1.1/server~1/image/nltprod.jpg" height=60 width=96>
<h1>NLT Produits</h1>
<br><UL><LI><a
href="http://www.compuserve.com/cgi-bin/gocserve?CIS:EWCFORUM">Forum Communauté
globale</a></UL>
<br><UL><LI><a
href="http://www.compuserve.com/cgi-bin/gocserve?CIS:TRANSLATE">Le Service de Traduction
de Document de compuServe (CDTS)</a></UL>
<center><h1></h1></center>
```

FROM FIG-6A

```
<br><img
src="file:///n|/iowebsrv/server/8100~1.1/server~1/image/wip.jpg"
height=60 width=96>
<h1>Les travaux-dans-le progrès</h1>
<br><UL><LI><a href="nlttest.htm">Le Domaine expérimental
(Introduit à votre propre risque. . .)</a></UL>
<br><UL><LI><a href="llab.htm">Laboratoire de
langue</a></UL>
<br><UL><LI><a href="mailtran.htm">Envoyer un message par
courrier électronique la Traduction</a></UL>
<br><UL><LI><a href="webtrans.htm">La Traduction de Page
de toile</a></UL>
<center><h1></h1></center>
<br><img
src="file:///n|/iowebsrv/server/8100~1.1/server~1/image/fracmtn.jpg" height=80 width=106>
<h1>Propositions</h1>
<br><UL><LI><a
href="http://jlammers/n:\projects\proposal\rose_gl.doc"> Verres Elevé-Colorés</a></UL>
<center><h1></h1></center>
```

FROM FIG-6B

```
<br><img
src="file:///nl/iowebsrv/server/8100~1.1/server~1/image/isle.jpg"
height=80 width=106>
<h1>Les points d'intérêt</h1>
<br><UL><LI><a
href="http://www.willamette.edu:80/~tjones/Language-Page.html">La Page
de Langues Humaine</a></UL>
<br><UL><LI><a href="http://www.ai.mit.edu">MIT le
Laboratoire d'Intelligence Artificiel</a></UL>
<center><h1></h1></center>
<br><img
src="file:///nl/iowebsrv/server/8100~1.1/server~1/image/mailto.gif"
height=20 width=27>
<p>Les commente/questions d'envoi à: </p>
<br><a href="mailto:jlammers@csi.compuserve.com">NLT Boîte à
lettres</a>
</body>
</html>
```

FIG-6C

INTEGRATED MULTILINGUAL BROWSER

BACKGROUND AND SUMMARY OF THE INVENTION

The present invention relates generally to the field of electronic communication over a computer network. Particularly, the present invention relates to the expansion of multi-lingual electronic communication through translation services for documents and messages available through the Internet.

The recent surge in media attention to the Internet, and especially the World Wide Web, coupled with the continuing growth in home PC ownership have resulted in a growing diversity of the Internet user population. No longer is the Internet the province of software experts; thousands of novice users have begun to come online each day. Software like CompuServe's Web Browser lets users quickly connect to and find useful content online. This phenomenon is not restricted to the United States or to English-speaking countries. Growth in online usage in Europe and Asia is increasing even more quickly than in the U.S.

While interest in the online world is at a peak, a significant obstacle exists to broad usage of the Internet for non-English speakers. The vast majority of Internet content is in English, and is therefore inaccessible to users with other native languages. Translation of Internet documents by a human translator is not a practical solution for two reasons. First, human translation is costly and slow. A translator can typically produce 300–400 words per hour at costs of 12¢ per word or more. Second, in order to have a translator convert Internet documents to the user's native language, the user would have to download every document he was interested in to provide it to the translator. This is a time-consuming process, and if the user knows no English, he will not even be able to assess the relevance of the document before downloading it. This would result in wasted time and translation costs since inevitably, some of the documents selected will not prove to be worthwhile.

The present invention allows non-English speaking Internet users to access and understand information available from the World Wide Web and related sources. Language translation software (known as machine translation, or MT) is combined with Internet software to allow non-English speaking Internet users to quickly generate translations of online text. The process is automated and therefore, less costly and time-consuming than human translation. Advantages of the present invention are explained further in relation to the following detailed description of the invention, drawings, and claims.

BRIEF DESCRIPTION OF THE DRAWINGS

FIGS. 2A and 2B comprise an example of a hypertext document;

FIGS. 3A –3C comprise an example of a hypertext document preprocessed according to the method of the present invention;

FIGS. 5A–5D comprise an example of a preprocessed hypertext document translated according to the method of the present invention;

FIGS. 6A–6C comprise an example of a translated hypertext document postprocessed according to the method of the present invention;

DETAIL DESCRIPTION OF PREFERRED EMBODIMENT(S)

Figure 1A:
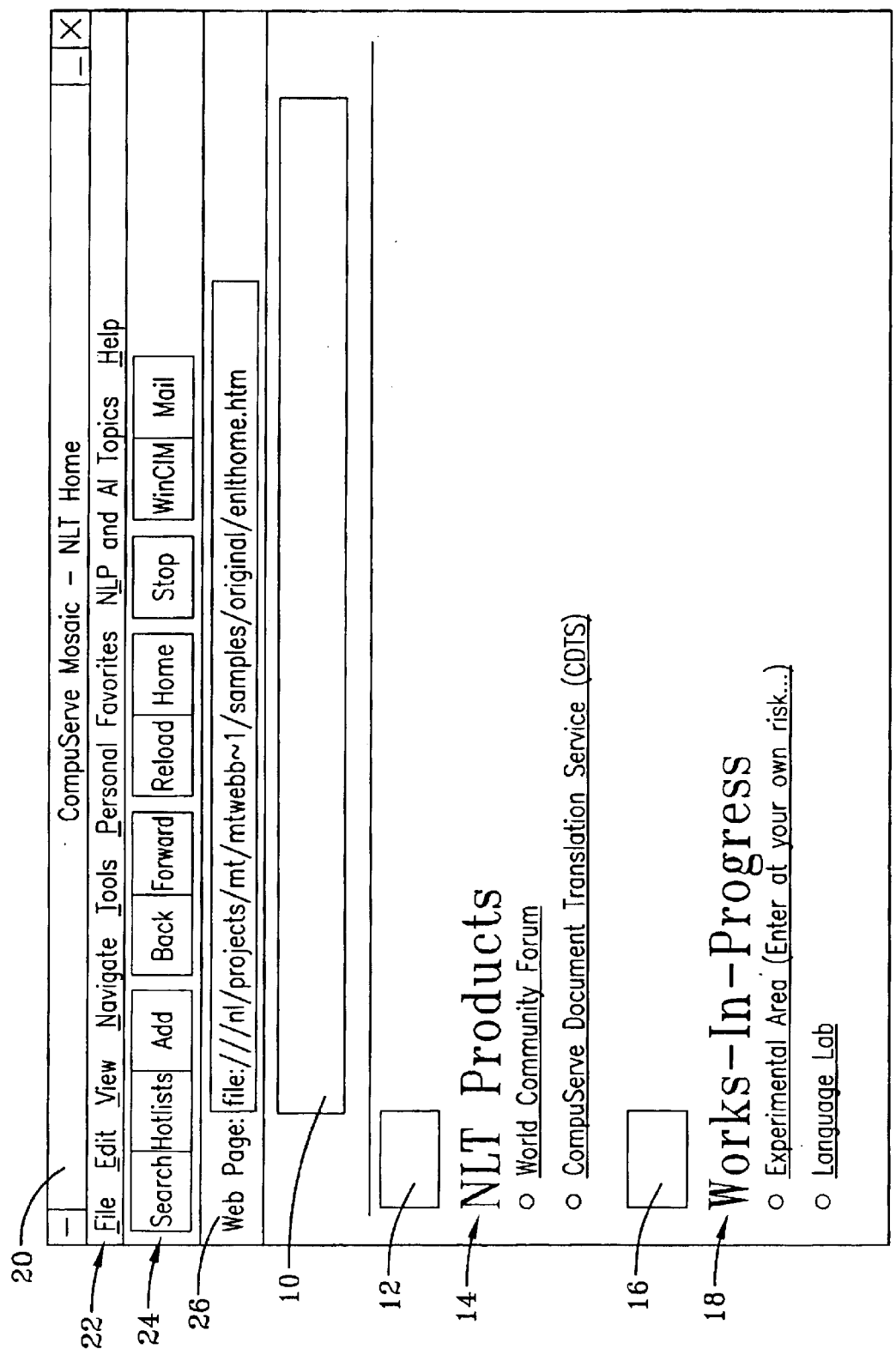
FIGS. 1A and 1B comprise a screen shot of a World Wide Web page.

Although the detailed description of a preferred embodiment focuses on automatic translation of World Wide Web pages, the concept is adaptable to documents obtained from other sources.

The World Wide Web (WWW or the Web) is a distributed information system that may be accessed through a number of sources. It is comprised of software and a set of protocols and conventions. Information on the Web may be accessed using a browser program such as CompuServe's Web Browser. Browsers allow users to read documents and to locate documents from other sources. They present an interface for interacting with the system and they process requests on behalf of the user.

Information providers on the WWW make their information available through programs that understand the Hyper-Text Transfer Protocol (HTTP). Browsers assist users in "visiting" Web sites where information is stored. Information is displayed in pages of text and graphics called "Web Pages." An example of a Web page as viewed through CompuServe's Web Browser is provided in FIGS. 1A and 1B. The Web page shown in FIGS. 1A and 1B contains both text 14, 18 and graphics 10, 12, 16. The title bar 20, menu options 22, buttons 24, and document information 26 appearing at the top of the screen are part of the browser used to view the Web page.

In most cases, information providers make information available through a Web server. The server responds to information requests by delivering the requested information to the user's browser for viewing. Some providers may make their information available through a proxy server that converts information in one format to the format expected and understood by the browser.

Documents available on the WWW and displayed by browsers are hypertext documents. Hypertext is text that contains references (or "links," "hyperlinks," or "hot spots" to other documents. The reference is similar to a footnote except the referenced document may be accessed directly from the original document. The related document may be viewed by selecting or clicking the mouse on the reference. The process of selecting hyperlinks to view referenced documents may be referred to as "traversing the hyperlinks." Unlike a footnote, references usually do not appear as shorthand descriptions of related documents. Instead, references may be indicated by a combination of graphics, different fonts, different colors for the text, underlining, the mouse pointer turning into a hand, etc. The referenced documents may reside on different computers at different Web sites.

Hypertext documents are written in a "markup language" call Hypertext Markup Language (HTML). HTML actually refers to both a document type and the markup language that represents instances of the document type. A hypertext document contains general semantics appropriate for representing display or presentation characteristics as well as information from a wide ranges of domains. A hypertext document consists of a sequence or stream of characters that comprise both data characters and markups. Markups are syntactically delimited characters (such as "<," ">," "#," etc.) added to the data characters to define the document's structure. Markups thus have special meanings and may represent such things as hypertext, news, mail, documentation, menus of options, and in-line graphics. Markups may be combined with other characters or related values to create codes that also have special meaning. Data characters are those characters in the document that are not codes.

Figure 1B:
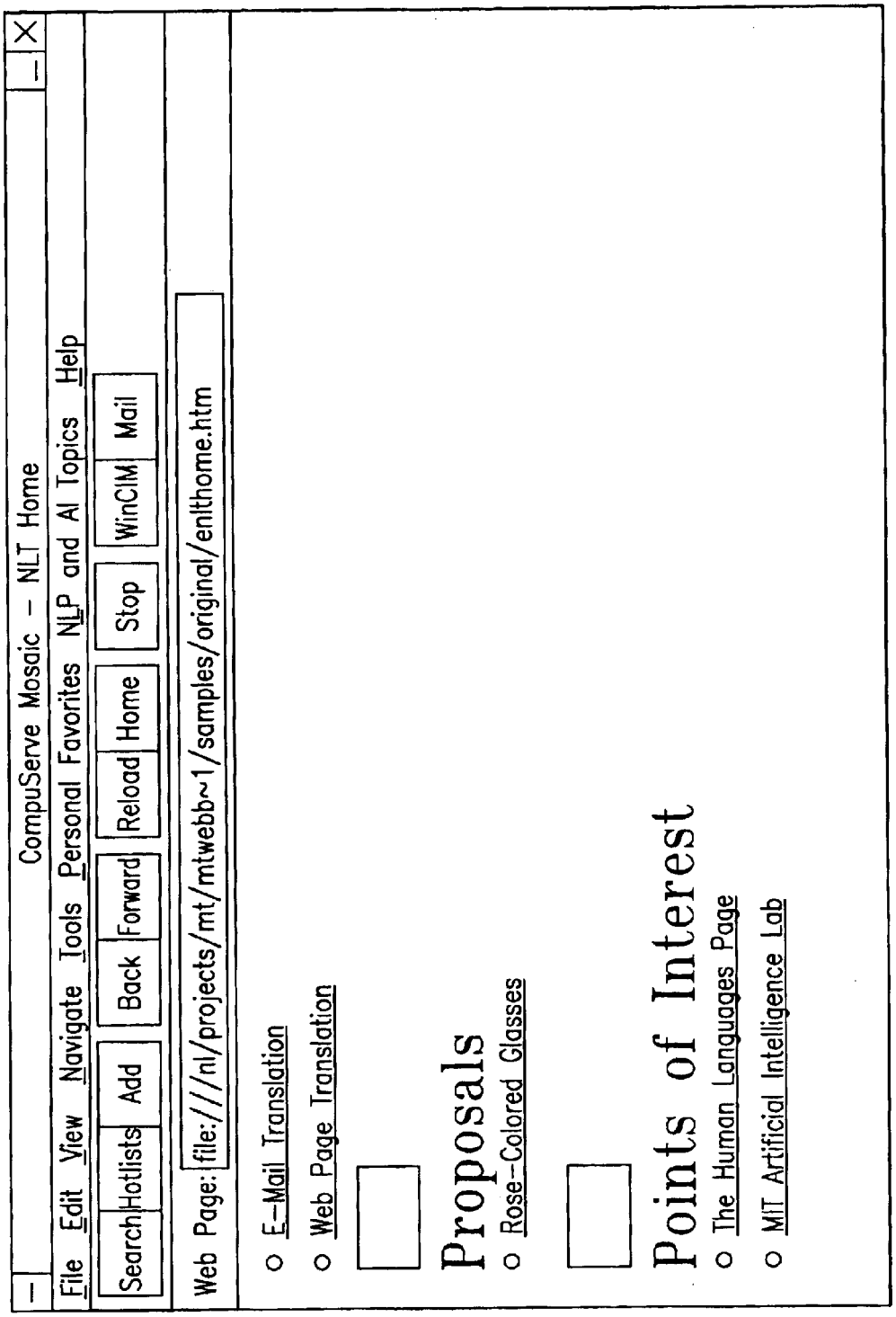

FIGS. 2A and 2B comprise the hypertext document that describes the Web page shown in FIGS. 1A and 1B. FIGS. 2A and 2B show the markups and related words (that comprise codes) as well as data characters that may appear in a hypertext document. For example, the characters "<" and ">" appearing throughout the document are markups. The characters "<" and ">" combined with the word "head" ("<head>") 30 may be considered a code. Finally, the text "NLT Home" 30 that is not surrounded by markups or codes may be considered data characters.

As indicated by the brief description, HTML documents have a well-defined and documented structure defined by a grammar. The codes in a HTML document convey important information regarding both the display or presentation of the document itself as well as related references and commands. Display and presentation information may include color information, information about graphics that appear on the page, information about text that appears on the page, etc. A HTML document is structured as a series of elements that are identified by the language markups and codes. A document includes a head (consisting of a title and other optional elements) and a body that is a text flow of paragraphs, lists, images, and other elements. The various parts of the document may be identified by looking at the markups or codes in the document. For example, referring again to FIGS. 2A and 2B which shows the hypertext for FIGS. 1A and 1B, the document head contains the title "NLT Home" 30. An image contained in the document is identified in the line "<br><img src="file:///n|/iowebsrv/server/8100~1.1/server~1/image/ntl.jpg" height=60 width=640></center>" 32.

As may be apparent, the process of translating a HTML document requires examination of each character in document. Characters may be examined individually and in combination to determine whether they are markups, codes, or data characters. To process a document, the processing software examines the character stream that comprises the document. The steps needed to translate a HTML document from one language to another may be summarized as follows:

Step 1. Preprocess the HTML document by placing boundary markers around HTML codes to be preserved during the translation process. The translation software recognizes the boundary markers and does not translate text and symbols appearing between the markers.

Step 2. Translate the preprocessed HTML document from the original language to the target language.

Step 3. Postprocess the translated HTML document to remove the boundary markers.

Step 1. The codes in a HTML document convey important information describing the characteristics of the Web page. Referring again to FIGS. 2A and 2B, an example of the type of information contained in a hypertext document is shown. Certain information contained in the document of FIG. 2A and 2B may be interpreted by a Web browser so that to the browser user, the images shown in FIGS. 1A and 1B appear. Certain information in the hypertext document is preserved during the translation process so that the translated page has, in general, the same appearance and behavior as the original page. Because HTML documents have a well-defined and known structure described by a grammar, automated translation of a HTML document is possible. The codes in the document may be discerned by the preprocessing software. Special boundary markers placed in the document by the preprocessing software indicate to the translation software that the intervening text should not be translated. Consequently, the resulting page may have the same appearance and behavior as the original page.

Referring to FIGS. 3A–3C, an example of a preprocessed HTML document is shown. The HTML document of FIGS. 3A–3C is the preprocessed version of the HTML document shown in FIGS. 2A and 2B. In this example, the boundary markers used to identify the HTML codes are the character pairs "{." and ".}". Any character or character combination that does not normally occur in text may be used as a boundary marker. The line that appeared as "<head><title>NLT Home<title><head>" in FIG. 2A (30) is preprocessed in Step 1 to the line "{.<head>.}-{.<title>.}NLT Home{.<title>.}-{. <head>.}" in FIG. 3A (40). Other lines in the document are preprocessed similarly.

Figure 4:
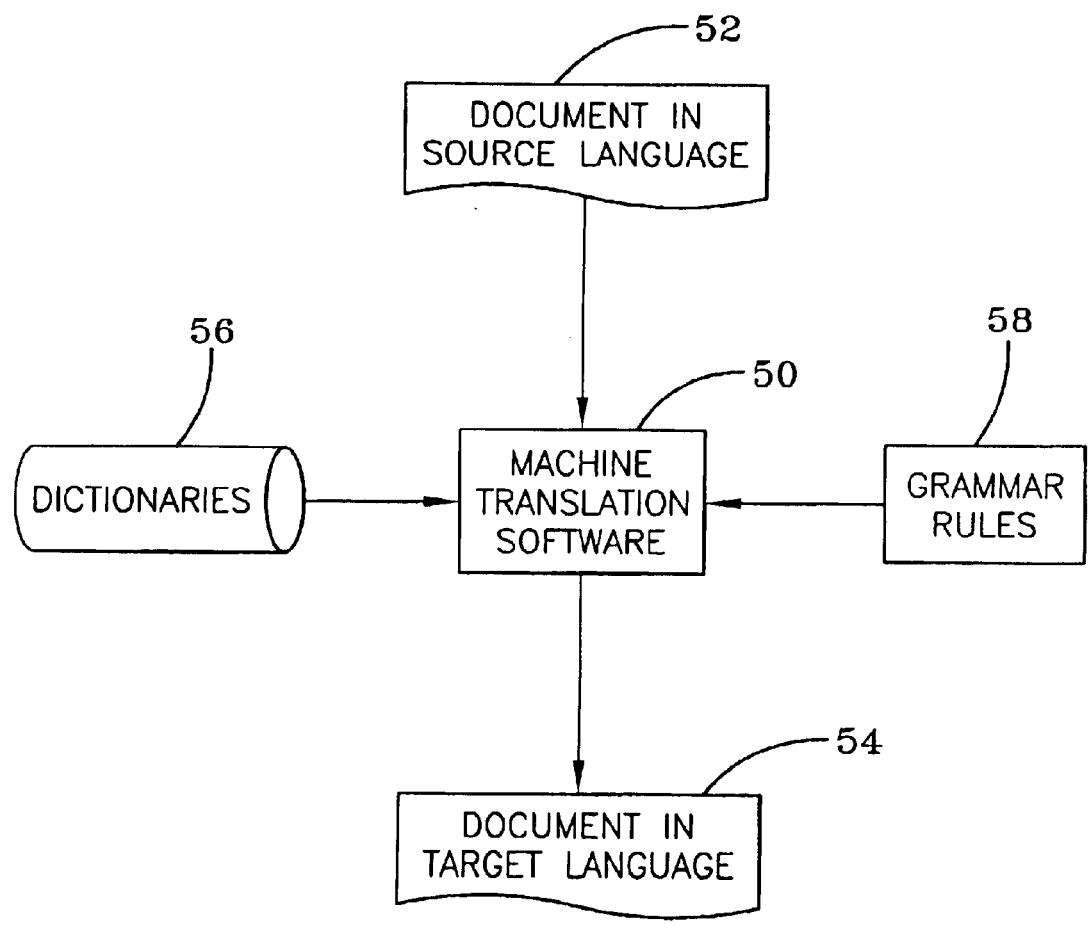
FIG. 4 illustrates a system for performing machine translation.

Step 2. Machine Translation (MT) software performs the translation of text from one language to another language. There are many commercially available MT software packages. FIG. 4 is an illustration of a system in which MT software 50 takes as input text in one language 52 and generates a rough draft translation of the text in another language 54 using an electronic dictionary 56 and a set of linguistic and/or statistical rules encoded in the program 58. MT software can perform language conversion operations very quickly; in some cases, at speeds of up to 3,000 words per minute. The translated texts are not high quality translations, but they are usually adequate for understanding what the document is about.

Referring to FIGS. 5A–5D, an example of a translated HTML document is shown. The HTML document of FIGS. 5A–5D is the translated version of the preprocessed HTML document shown in FIGS. 3A–3C. As described above, the boundary markers used to identify the HTML codes are the character pairs "{." and ".}". Consequently, the MT software ignores all text that falls between the boundary markers. Data characters that are not surrounded by boundary markers are translated by the MT software. The preprocessed line that appeared as "{.<head>.}-{.<title>.}NLT Home{.<title>}-{<head>.}" in FIG. 3A (40) is translated in Step 2 to the line "{.<head>.}-{.<title>.}NLT Maison{.<title>.}-{.<head>.}" in FIG. 5A (60).

Figure 7A:
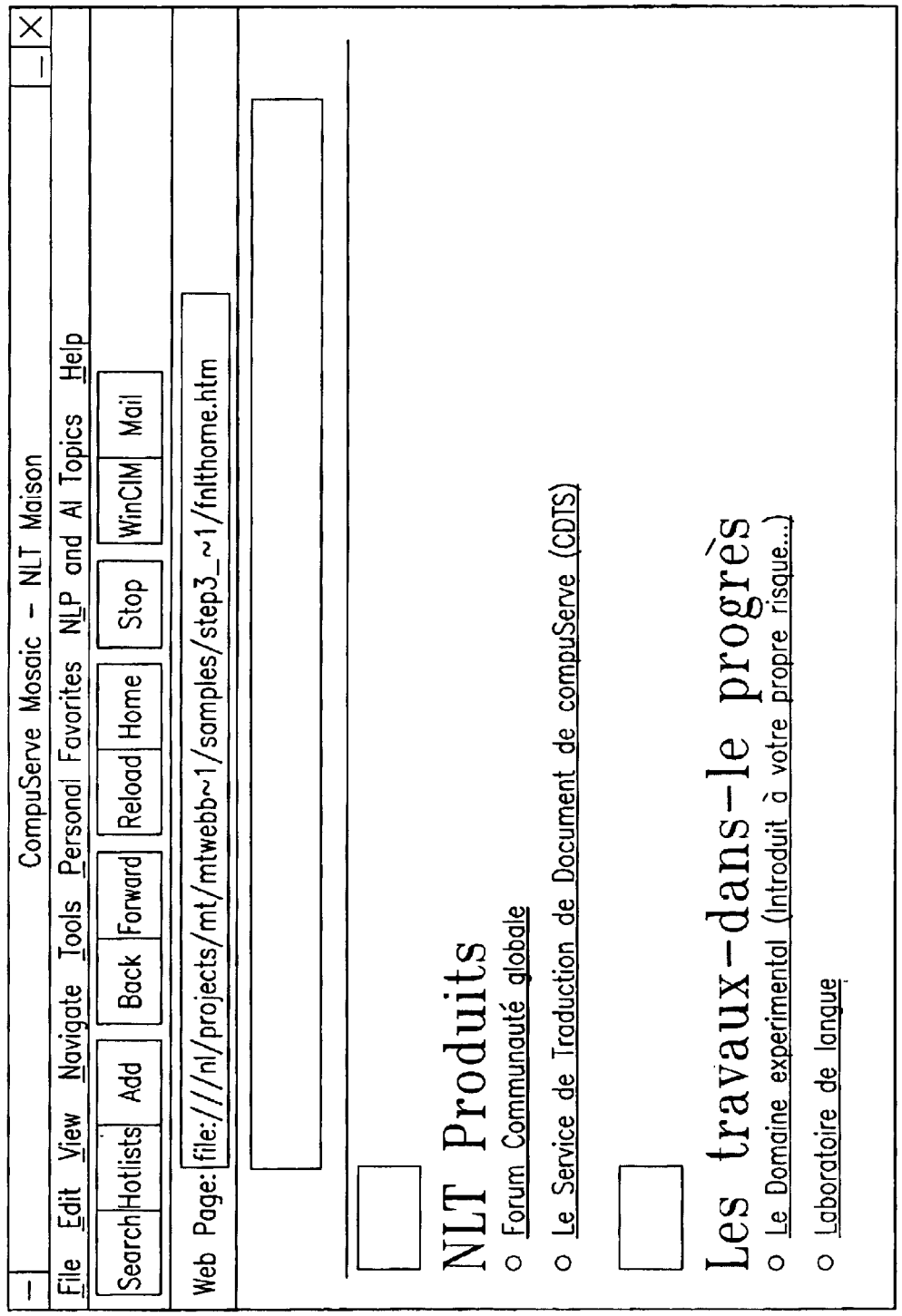
FIGS. 7A and 7B comprise a screen shot of a World Wide Web page that has been translated according to the method of the present invention.
Figure 7B:
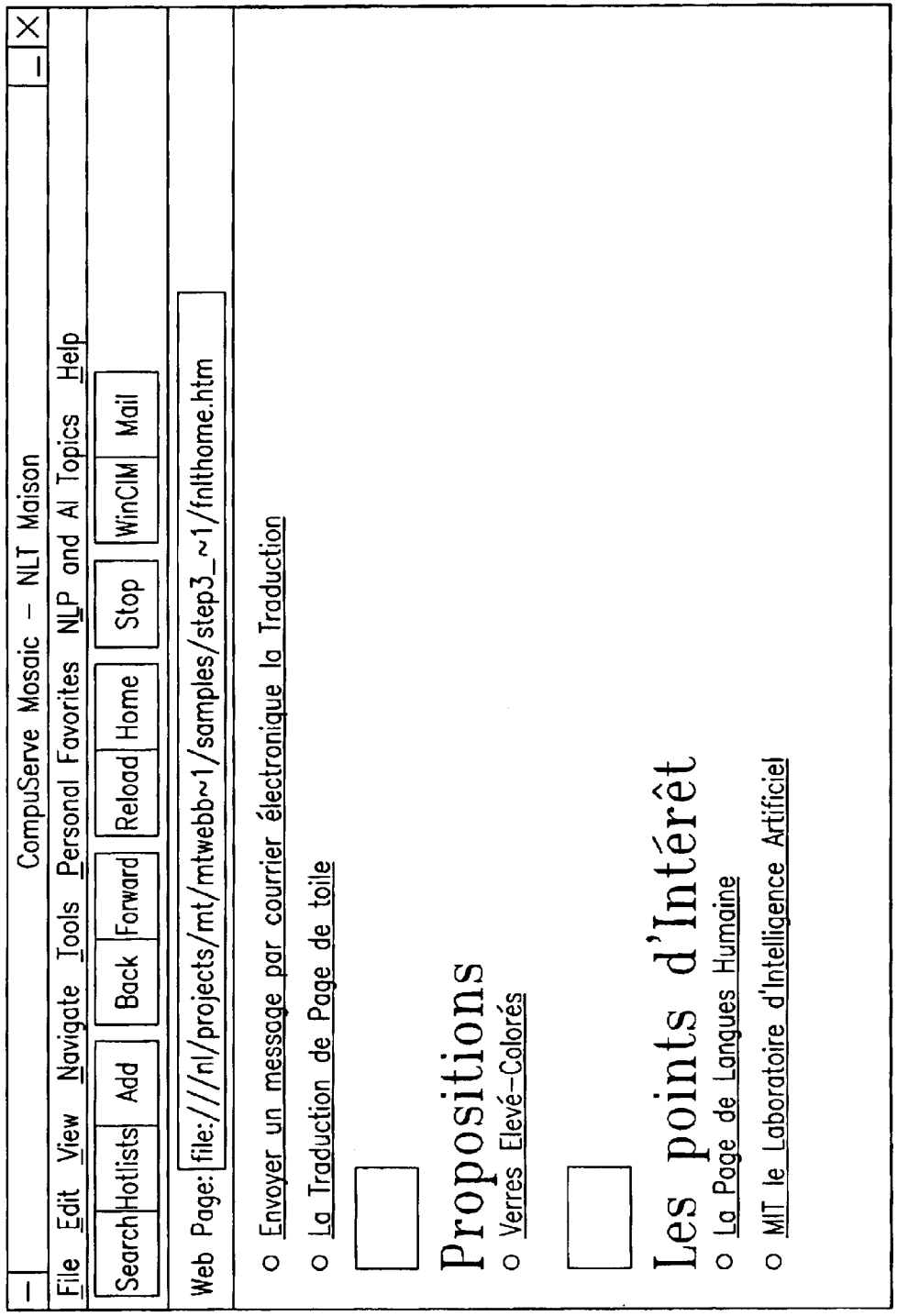

Step 3. In the final step, postprocessing software removes boundary markers from the translated document. Referring to FIGS. 6A–6C, an example of a postprocessed HTML document is shown. The HTML document of FIGS. 6A–6C is the postprocessed version of the translated HTML document shown in FIGS. 5A–5D. As described above, the boundary markers used to identify the HTML codes are the character pairs "{." and ".}". During postprocessing, these boundary, markers are removed. The translated line that appeared as "{.<head>.}-{.<title>.}NLT Maison{. <title>.}-{.<head>.}" in FIG. 5A (60) is postprocessed in Step 3 to the line "<head><title>NLT Maison<title><head>" in FIG. 6A (70). The postprocessed HTML document of FIG. 6A may then be displayed by the browser as shown in FIGS. 7A and 7B.

Figure 8:
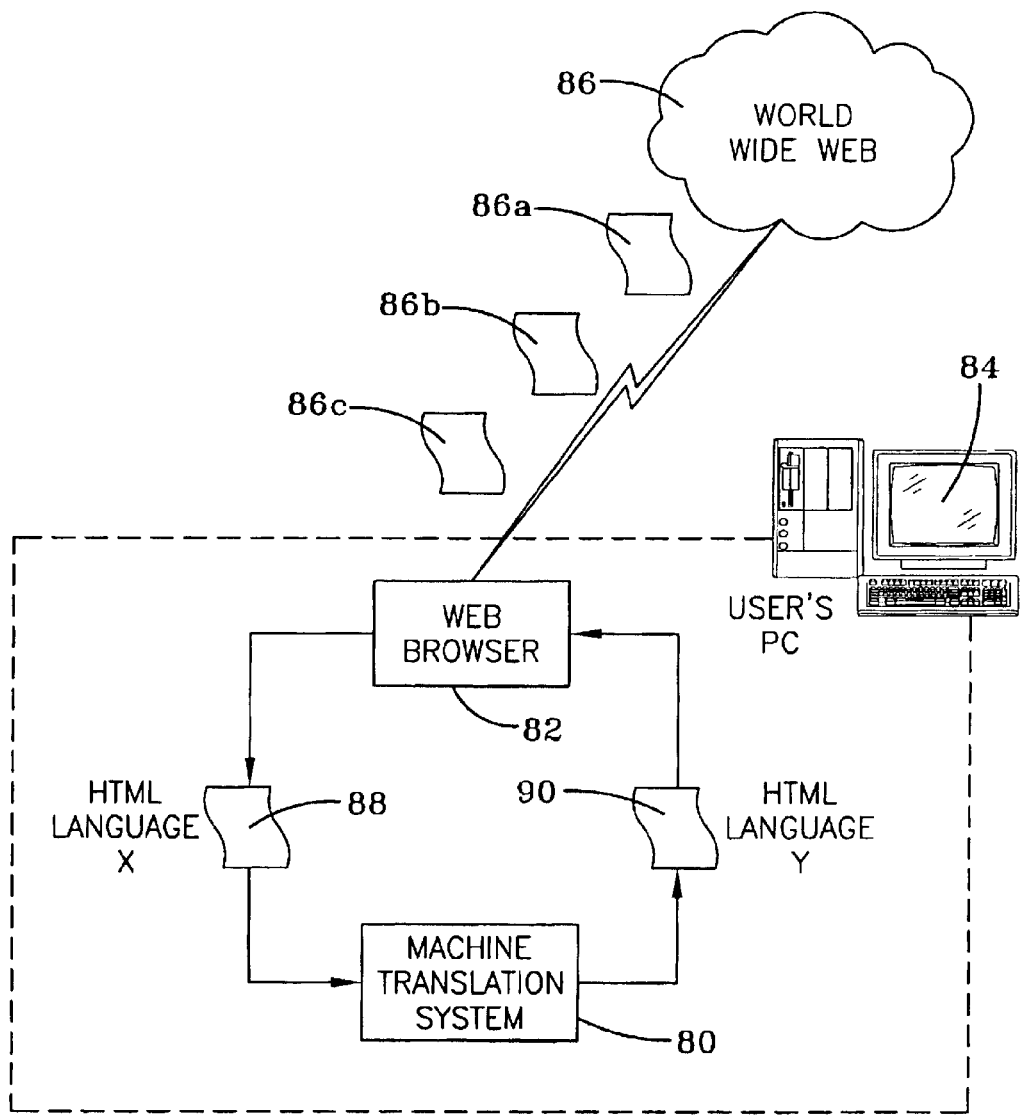
FIG. 8 is a diagrammatic view of one embodiment of the present invention in which machine translation is integrated into a Web browser.

FIG. 8 is a diagrammatic view of one embodiment of the present invention in which machine translation is integrated into a Web browser. MT software 80 may be combined with a browser 82 to allow the user 84 to rapidly and automatically translate online documents from the World Wide Web 86 into his native language. The MT software 80 may be bundled with the browser 82 to form an integrated multilingual browser. The user 84 of the multilingual browser 82 selects the desired target language, (e.g. French if the user speaks French), and the Web document retrieved by the browser 88 may be rapidly translated on-the-fly with a mouse click. The Web Browser 82 then displays for the user 84 the translated document 90. Optionally, the user may be able to update and edit parts of the MT software's electronic dictionaries to include terminology common to the Web sites he visits.

Although a document may be translated at the time that a user requests access to the document, a document may also be "pre-translated" and stored in a cache for later retrieval before a user seeks access to it. Documents that have been accessed at least once may also be stored following translation. The advantage of storing documents that have been translated is that delivery time to the user may be reduced. Although storing documents requires disk space, it may represent a better use of system resources because documents that are accessed frequently are translated once rather than every time they are accessed.

Figure 9:
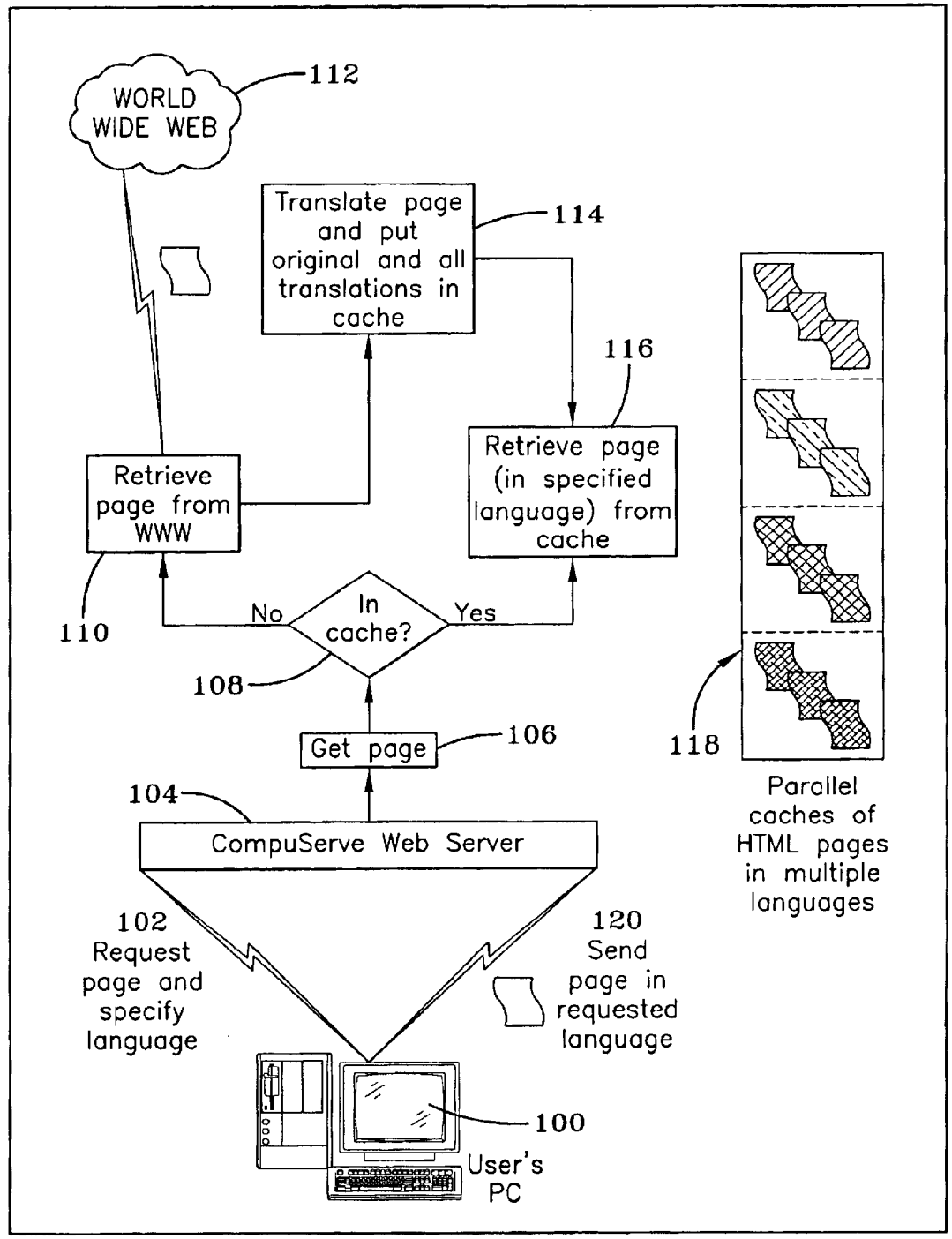
FIG. 9 is a diagrammatic view of one embodiment of the present invention in which pre-translated Web pages are accessible from a server.

FIG. 9 is a diagrammatic view of an alternative implementation in which pre-translated Web pages are stored on a Web server 104. The translation software resides on a translation server 104 (possibly the same machine as the Web server). Popular Web pages 114 are pre-translated and stored in a cache 118, with additional pages being added as they are requested by users 100. The cache is a dynamic storage device with a finite capacity. New, pretranslated pages are added to the cache, but pages will also be removed from the cache if they are used infrequently or if there are constraints on storage capacity.

In accessing the system, a user 100, sends to the Web Server 104 a request for a specific page in a specific language 102. The Web Server 104 then sends a request to get the desired page 106. The method for servicing the request depends on where the page is located. If the page has been pre-translated 114 and stored in the cache of pages in multiple languages 118 it is retrieved from the cache 116 and returned to the user in the requested language 120. If the page has not been pre-translated, then the page is retrieved 110 from the World Wide Web 112, translated into the requested language, and cached 120 before being sent to the user 100.

Translation of Web pages, in either the bundled browser/MT configuration or the Web Server configuration, requires processing of HTML codes containing reference, command, and display information. Preferably, the HTML codes are identified prior to translation, then surrounded by special boundary markers to block the translation process on the codes. The HTML preprocessor uses its knowledge regarding the markups, codes, data characters and the structure of HTML documents to determine which codes should be blocked from the translation process. After translation is complete, a postprocessing program removes the special boundary markers so that the necessary references, commands, and display characteristics are available in the translated text.

The primary objective of the present invention is to allow a user of the Internet to read hypertext documents that are available only in a language foreign to the user. The readable text of the hypertext document is changed in accordance with the users preferred language. Steps are taken to preserve the document's appearance and behavior so that the only noticeable difference between the original document and the translated document is the language of the text. Users may interact with the translated document and reference related documents in the same manner that users interact with the original document.

What is claimed is:

1. A system for automatically translating source documents in any of a plurality of source languages into target documents in any of a plurality of target languages and for delivering the target documents over a network in response to user requests for source documents, the system comprising:
   (a) a reference document that contains a first reference to a first source document, the first source document containing a second reference to a second source document, the first and second references for use by a user over the network to request, respectively, the first and second source documents, the first and second source documents each including text in a respective source language to be translated into a respective target language and codes not to be translated;
   (b) machine translation software that, upon receipt of the first or second source document, translates the text of that source document from the respective source language into the respective target language; and
   (c) a server that:
      (i) in response to the users use of the first reference to request the first source document, retrieves the first source document, automatically invokes the machine translation software, and delivers to the user over the network a first target document containing the translated text in the respective target language, the untranslated codes and a version of the second reference to the second source document; and
      (ii) in response to the user's use of the version of the second reference to the second source document contained in the first target document, retrieves the second source document, invokes the machine translation software, and delivers to the user over the network a second target document containing the translated text in the respective target language and the untranslated codes.

2. The system of claim 1 wherein each source document is an HTML document.

3. The system of claim 1 wherein each source document is a web page.

4. The system of claim 1 wherein each source language is specified by the user via a web browser.

5. The system of claim 1 wherein each target language is specified by the user via a web browser.

6. The system of claim 1 wherein each target document is an HTML document.

7. The system of claim 1 wherein each target document is a web page.

8. The system of claim 1 wherein the server is an HTTP server.

9. The system of claim 1 wherein each target document is delivered to a web browser of the user.

10. The system of claim 1 wherein the machine translation software comprises:
   (a) pre-processing software that identifies the codes not to be translated in the first or second source document;
   (b) translation software that translates the text of the first or second source document from the source language into the target language; and (c) post-processing software that integrates the translated text in the target language with the untranslated codes.

11. The system of claim 10 wherein each source document is an HTML document.

12. The system of claim 10 wherein each source document is a web page.

13. The system of claim 10 wherein each source language is specified by the user via a web browser.

14. The system of claim 10 wherein each target language is specified by the user via a web browser.

15. The system of claim 10 wherein each target document is an HTML document.

16. The system of claim 10 wherein each target document is a web page.

17. The system of claim 10 wherein the server is an HTTP server.

18. The system of claim 10 wherein each target document is delivered to a web browser of the user.

19. A system for automatically translating source documents in any of a plurality of source languages into target documents in any of a plurality of target languages, such automatic translation performed in response to user requests for source documents via documents containing references to the source documents, the system comprising:

(a) a preprocessor that parses a first source document requested by a user over the network via a document referencing the first source document, parses a second source document requested by the user over the network via a reference to the second source document, the first and second source documents each including text in a respective source language to be translated into a respective target language and codes not to be translated, and identifies the codes not to be translated;

(b) a translator that translates the text of the first and second source document from the respective source language into the respective target language; and (c) a post-processor that integrates the translated text in the respective target language with the untranslated codes to generate a respective target document.

20. The system of claim 19 wherein each source document is an HTML document.

21. The system of claim 19 wherein each source document is a web page.

22. The system of claim 19 wherein each source language is specified by the user via a web browser.

23. The system of claim 19 wherein each target language is specified by the user via a web browser.

24. The system of claim 19 wherein each target document is an HTML document.

25. The system of claim 19 wherein each target document is a web page.

26. The system of claim 19 wherein an HTTP server, in response to the user's request for the first or second source document, automatically invokes the preprocessor, the translator and the post-processor, and delivers the respective target document to an HTTP client over the network.

27. The system of claim 19 wherein an HTTP client receives the first or second source document requested by the user over the network and, in response, automatically invokes the preprocessor, the translator and the post-processor, and displays the respective target document.

28. The system of claim 19 wherein each target document is delivered to a web browser of the user.

29. A system for automatically translating source documents in any of a plurality of source languages into target documents in any of a plurality of target languages, the system comprising:

(a) client software that requests a first source document over a network via a reference document that contains a first reference to the first source document, and requests a second source document over the network via a second reference to the second source document, the first and second source documents each including text in a respective source language to be translated into a respective target language and codes not to be translated; and (b) machine translation software which, upon being invoked by the client software in response to the delivery over the network of the first or second source document requested by the client software, automatically translates the text of the first and second source document from the respective source language into the respective target language and generates for display by the client software a respective target document containing the translated text in the respective target language and the untranslated codes.

30. The system of claim 29 wherein each source document is an HTML document.

31. The system of claim 29 wherein each source document is a web page.

32. The system of claim 29 wherein each source language is specified by the user via a web browser.

33. The system of claim 29 wherein each target language is specified by the user via a web browser.

34. The system of claim 29 wherein each target document is an HTML document.

35. The system of claim 29 wherein each target document is a web page.

36. The system of claim 29 wherein the machine translation software comprises:

(a) pre-processing software that identifies the codes not to be translated in the first or second source document;

(b) translation software that translates the text of the first or second source document into the respective target language; and (c) post-processing software that integrates the translated text in the respective target language with the untranslated codes to generate the respective target document for display by the client software.

37. The system of claim 36 wherein each source document is an HTML document.

38. The system of claim 36 wherein each source document is a web page.

39. The system of claim 36 wherein each source language is specified by the user via a web browser.

40. The system of claim 36 wherein each target language is specified by the user via a web browser.

41. The system of claim 36 wherein each target document is an HTML document.

42. The system of claim 36 wherein each target document is a web page.

43. A method for automatically translating source documents in any of a plurality of source languages into target documents in any of a plurality of target languages and for delivering the target documents over a network in response to user requests for source documents, the method comprising the steps of:

(a) receiving a request from a user over the network for a first source document referenced by a reference document accessible to the user, and a request for a second source document referenced by the first source document, the first or second source documents each including text in a respective source language to be translated into a respective target language and codes not to be translated;

(b) retrieving the first or second source document in response to the user's respective requests, and translating the text of that source document from the respective source language into the respective target language; and (c) delivering to the user over the network a respective target document containing the translated text in the respective target language and the untranslated codes.

44. The method of claim 43 wherein each source document is an HTML document.

45. The method of claim 43 wherein each source document is a web page.

46. The method of claim 43 wherein each source language is specified by the user via a web browser.

47. The method of claim 43 wherein each target language is specified by the user via a web browser.

48. The method of claim 43 wherein each target document is an HTML document.

49. The method of claim 43 wherein each target document is a web page.

50. The method of claim 43 wherein the server is an HTTP server.

51. The method of claim 43 wherein each target document is delivered to a web browser of the user.

52. The method of claim 43 wherein the step of translating the text from the respective source language into the respective target language comprises:

(a) identifying the codes not to be translated in the respective source document;

(b) translating the text from the respective source language into the respective target language; and (c) integrating the translated text in the respective target language with the untranslated codes.

53. The method of claim 52 wherein each source document is an HTML document.

54. The method of claim 52 wherein each source document is a web page.

55. The method of claim 52 wherein each source language is specified by the user via a web browser.

56. The method of claim 52 wherein each target language is specified by the user via a web browser.

57. The method of claim 52 wherein each target document is an HTML document.

58. The method of claim 52 wherein each target document is a web page.

59. The method of claim 52 wherein the server is an HTTP server.

60. The method of claim 52 wherein each target document is delivered to a web browser of the user.

61. A method for automatically translating source documents in any of a plurality of source languages into target documents in any of a plurality of target languages, such automatic translation performed in response to user requests for source documents via documents containing references to the source documents, the method comprising the steps of:

(a) parsing a first source document requested by a user over the network, parsing a second source document requested by the user over the network via a reference to the second source document, the first and second source documents each including text in a respective source language to be translated into a respective target language and codes not to be translated, and identifying the codes not to be translated;

(b) translating the text of the first and second source document from the respective source language into the respective target language; and (c) integrating the translated text in the respective target language with the untranslated codes to generate a respective target document.

62. The method of claim 61 wherein each source document is an HTML document.

63. The method of claim 61 wherein each source document is a web page.

64. The method of claim 61 wherein each source language is specified by the user via a web browser.

65. The method of claim 61 wherein each target language is specified by the user via a web browser.

66. The method of claim 61 wherein each target document is an HTML document.

67. The method of claim 61 wherein each target document is a web page.

68. The method of claim 61 wherein each target document is delivered over the network by an HTTP server.

69. The method of claim 61, wherein each target document is delivered to a web browser of the user.

70. A method for automatically translating source documents in any of a plurality of source languages into target documents in any of a plurality of target languages, the method comprising the steps of:

(a) requesting over a network a first source document, via a reference document that contains a reference to the first source document, and a second source document via a reference to the second source document, the first and second source documents each including text in a respective source language to be translated into a respective target language and codes not to be translated;

(b) receiving the first or second source document over the network in response to the respective request; and (c) upon receiving the first and second source document, translating the text from the respective source language into the respective target language and generating for display a respective target document containing the translated text in the respective target language and the untranslated codes.

71. The method of claim 70 wherein each source document is an HTML document.

72. The method of claim 70 wherein each source document is a web page.

73. The method of claim 70 wherein each source language is specified by the user via a web browser.

74. The method of claim 70 wherein each target language is specified by the user via a web browser.

75. The method of claim 70 wherein each target document is an HTML document.

76. The method of claim 70 wherein each target document is a web page.

77. The method of claim 70 wherein the step of translating the text from the respective source language into the respective target language comprises:

(a) identifying the codes not to be translated in the respective source document;

(b) translating the text into the respective target language; and (c) integrating the translated text in the respective target language with the untranslated codes and generating for display the target document containing the translated text in the respective target language and the untranslated codes.

78. The method of claim 77 wherein each source document is an HTML document.

79. The method of claim 77 wherein each source document is a web page.

80. The method of claim 77 wherein each source language is specified by the user via a web browser.

81. The method of claim 77 wherein each target language is specified by the user via a web browser.

82. The method of claim 77 wherein each target document is an HTML document.

83. The method of claim 77 wherein each target document is a web page.

* * * * *

UNITED STATES PATENT AND TRADEMARK OFFICE
CERTIFICATE OF CORRECTION

PATENT NO. : 6,993,471 B1  Page 1 of 1
DATED : January 31, 2006
INVENTOR(S) : Flanagan et al.

It is certified that error appears in the above-identified patent and that said Letters Patent is hereby corrected as shown below:

Column 3,
Line 67, delete "FIG." and insert -- FIGS. --.

Column 4,
Line 3, delete "inform ation" and insert -- information --.
Lines 24-25, delete ""{.<head>.}-{.<title>.}NLT Home{.<title>.}-{.<head>.}"" and insert -- "{.<head>.}{.<title>.}NLT Home{.<title>.}{.<head>.}" --.
Lines 49-50, delete ""{.<head>.}-{.<title>.}NLT Home{.<title>}-{<head>.}"" and insert -- "{.<head>.}{.<title>.}NLT Home{.<title>}{<head>.}" --.
Lines 51-52, delete ""{.<head>.}-{.<title>.}NLT Maison{.<title>.}-{.<head>.}"" and insert -- "{.<head>.}{.<title>.}NLT Maison{.<title>.}{.<head>.}" --.
Line 61, delete "boundary, markers" and insert -- boundary markers --.
Lines 63-64, delete ""{.<head>.}-{.<title>.}NLT Maison{.<title>.}-{.<head>.}"" and insert -- "{.<head>.}{.<title>.}NLT Maison{.<title>.}{.<head>.}" --.
Line 65, delete "FIG. 6A" and insert -- FIGS. 6A-C --.

Column 9,
Line 1, delete "first or second" and insert -- first and second --.

Column 10,
Line 19, delete "61, wherein" and insert -- 61 wherein --.
Line 33, delete "first or second" and insert -- first and second --.

Signed and Sealed this

Twenty-fifth Day of April, 2006

JON W. DUDAS
*Director of the United States Patent and Trademark Office*